Patented Sept. 11, 1934

1,973,025

UNITED STATES PATENT OFFICE 1,973,025

ACID WOOL DYESTUFF OF THE ANTHRAQUINONE SERIES

Carl Taube, Leverkusen-on-the-Rhine, Ludwig Zeh, Wiesdorf-on-the-Rhine, and Josef Hilger, Cologne-Mulheim, Germany, assignors to General Aniline Works, Inc., New York, N. Y., a corporation of Delaware No Drawing. Application July 21, 1930, Serial No. 469,628. In Germany July 24, 1929

6 Claims. (Cl. 260—60)

The present invention relates to a process of preparing acid wool dyestuffs of the anthraquinone series and to the new dyestuffs obtainable by said process.

We have found that new valuable acid wool dyestuffs are obtainable by reacting upon 1-amino-4-bromo-anthraquinone-2-sulfonic acid with a compound of the general formula

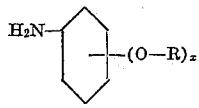

wherein —O—R means the radical of a bi- or trivalent aliphatic alcohol being connected with the benzene nucleus by an oxygen atom of the alcohol, $x$ means one of the numbers 1 or 2. Such compounds are for example o- or p-aminophenolglycolether, aminophenolglycerineethers, aminohydroquinonediglycolethers and the like. The reaction may be performed by dissolving the starting components in water or a suitable organic solvent, such as alcohol, pyridine etc., adding, if necessary, an acid binding agent, such as sodium- or potassium carbonate, pyridine, sodium acetate etc. and adding a suitable copper catalyst, such as copper powder, copper acetate, copper chloride, copper sulfate, cuprous bromide or the like. The reaction mixture is then heated, advantageously to about 60–100° C., until reaction is complete. The deep blue solution is filtered and the dyestuff isolated from the filtrate by salting out. The products thus obtainable form blue crystals, soluble in strong sulfuric acid with a green coloration, which changes into greenish-blue to blue by the addition of formaldehyde. The new products are soluble in water, pyridine or other suitable organic solvents with a blue coloration. They dye wool from an acid bath strong clear and especially even blue shades, by which latter property they are superior to other known dyestuffs of similar structure.

The following examples illustrate our invention without limiting it thereto.

Example 1

3.8 grams of 1-amino-4-bromoanthraquinone-2-sulfonic acid are heated to boiling for 30 minutes with 5 grams of para-amino-phenolglycolether, 10 grams of sodium carbonate and a small quantity of a 10% solution of copper sulfate in 150 ccs. of water. The resulting deep blue solution is diluted with water, filtered and the dyestuff salted out and dried.

It dyes wool from an acetic acid bath in clear blue shades. The dyestuff shows an excellent faculty of level dyeing.

Example 2

3.8 grams of 1-amino-4-bromoanthraquinone-2-sulfonic acid are heated for one hour on the water bath with 6 grams of para-aminophenolglycerolether, 10 grams of sodium carbonate and a small quantity of aqueous copper sulfate solution in 150 ccs. of water. The deep blue solution is diluted with water, filtered and the dyestuff salted out and dried. Wool is dyed from an acetic acid bath in clear blue shades.

Example 3

3.8 grams of 1-amino-4-bromoanthraquinone-2-sulfonic acid are heated to boiling for 30 minutes with 5 grams of ortho-amino-phenolglycolether, 10 grams of sodium carbonate and a small quantity of aqueous copper sulfate solution in 150 ccs. of water. The solution is diluted with water, filtered and the dyestuff salted out and dried.

The dyestuff dyes wool from an acetic acid bath in clear, greenish blue shades of excellent evenness.

It may be mentioned that the dyestuffs obtainable according to our new process probably correspond in their free form to the general formula

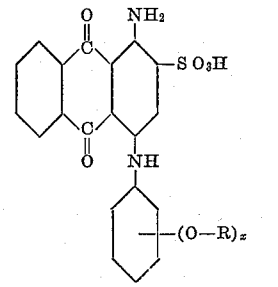

wherein —O—R stands for the radical of a bi- or trivalent alcohol, $x$ means one of the numbers 1 or 2.

We claim:—

1. Process which comprises heating 1-amino-4-bromoanthraquinone-2-sulfonic acid with a compound of the formula

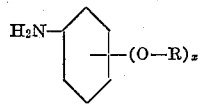

wherein —O—R stands for an alkoxy-hydrogen group of a bi- or trihydric alcohol being connected with the benzene nucleus by an oxygen atom of the alcohol, $x$ means one of the numbers 1 or 2, in the presence of water and of an acid binding agent.

2. Process which comprises heating 1-amino-4-bromoanthraquinone-2-sulfonic acid with a compound of the formula

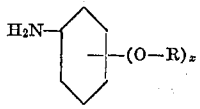

wherein —O—R stands for an alkoxy-hydrogen group of a bi- or trihydric alcohol being connected with the benzene nucleus by an oxygen atom of the alcohol, $x$ means one of the numbers 1 or 2, in the presence of water, a copper catalyst and of an acid binding agent.

3. Process which comprises heating 1-amino-4-bromoanthraquinone-2-sulfonic acid with a compound of the formula

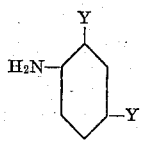

wherein one Y stands for hydrogen and the other Y means the residue —O—CH$_2$—CH$_2$—OH, in the presence of water and of an acid binding agent.

4. Process which comprises heating 1-amino-4-bromoanthraquinone-2-sulfonic acid with a compound of the formula

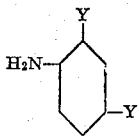

wherein one Y stands for hydrogen and the other Y means the residue —O—CH$_2$—CH$_2$—OH, in the presence of water, of a copper catalyst and of an acid binding agent.

5. The new dyestuffs having in their free form the formula

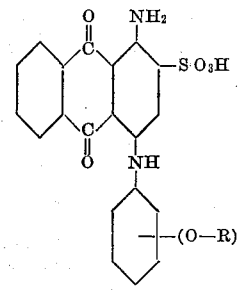

wherein —O—R stands for an alkoxy-hydrogen group of a bi- or trihydric alcohol being connected with the benzene nucleus by an oxygen atom of the alcohol, $x$ means one of the numbers 1 or 2, said dyestuffs forming blue crystals soluble in strong sulfuric acid with a green coloration changing into greenish blue to blue by the addition of formaldehyde, dyeing wool from an acid bath strong clear and especially even blue shades.

6. The dyestuff of the formula

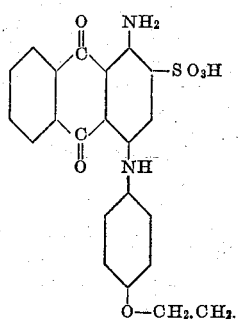

said dyestuff dyeing wool from an acetic acid bath clear blue and even shades.

CARL TAUBE.
LUDWIG ZEH.
JOSEF HILGER.